United States Patent [19]

Cooper

[11] 4,260,028
[45] Apr. 7, 1981

[54] EARTH WORKING ATTACHMENT FOR TRACTORS

[76] Inventor: Joseph C. Cooper, P.O. Box 386, Simpsonville, S.C. 29681

[21] Appl. No.: 961,625

[22] Filed: Nov. 17, 1978

[51] Int. Cl.³ .............................................. A01B 63/04
[52] U.S. Cl. ...................................... 172/298; 172/494
[58] Field of Search ............... 172/308, 309, 297, 298, 172/300, 304, 303, 306, 494

[56] References Cited

U.S. PATENT DOCUMENTS

| | | | |
|---|---|---|---|
| 1,442,504 | 1/1923 | Wilson | 172/297 |
| 1,442,562 | 1/1923 | Ferguson | 172/298 |
| 1,834,667 | 12/1931 | Wood | 172/297 |
| 2,176,326 | 10/1939 | Brown | 172/272 X |
| 2,368,312 | 1/1945 | Luger | 172/298 |
| 2,413,467 | 12/1946 | Patterson | 172/298 |
| 2,682,820 | 7/1954 | Ludema | 172/298 |
| 2,987,127 | 6/1961 | Morrison | 172/298 |

FOREIGN PATENT DOCUMENTS 610144  10/1948  United Kingdom ..................... 172/297

*Primary Examiner*—Richard J. Johnson
*Attorney, Agent, or Firm*—Bailey, Dority & Flint

[57] ABSTRACT

An earth working attachment which can be easily manufactured, assembled and installed on a tractor of any size but is primarily suitable for garden type tractors as have low horsepower and includes tractor mounting brackets, a main beam supporting the earth working tools, and a lifting means for raising and lowering the tools in a plane exteriorly of the rear wheels of the tractor.

2 Claims, 4 Drawing Figures

EARTH WORKING ATTACHMENT FOR TRACTORS

BACKGROUND OF THE INVENTION

The prior art contains earth working attachments which can be readily mounted and removed from a tractor as desired. These attachments support any number of tools for working and preparing the soil and the art has developed to a stage wherein portions of classes 111 and 172 in the United States Patent Office are directed to this general combination. Generally speaking, many of these attachments lack simplicity in design due to complex linkage and mounting brackets, all of which is time consuming to the operator and which adds additional weight and strain to the tractor. Such prior art includes the following patents: U.S. Pat Nos. 2,368,312, 2,413,467, and 2,987,127.

BRIEF DESCRIPTION OF THE INVENTION

The present invention is directed to a simple earth working attachment which is easily fabricated, economical in cost, and readily mounted to a tractor by a single person due to its design and the relative light weight of the same. The attachment is comprised of a main beam tool bar pivoted at one end to a support bracket located adjacent the front end of the tractor and a rear end which is connected by linkage to a second support bracket located adjacent the rear wheels thereof with said linkage including means for raising and lowering the bar in a plane outside the plane of the tractor wheels whereby the earth working tools secured thereon will be moved into and out of earth working engagement outside the path of an adjacent rear wheel.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
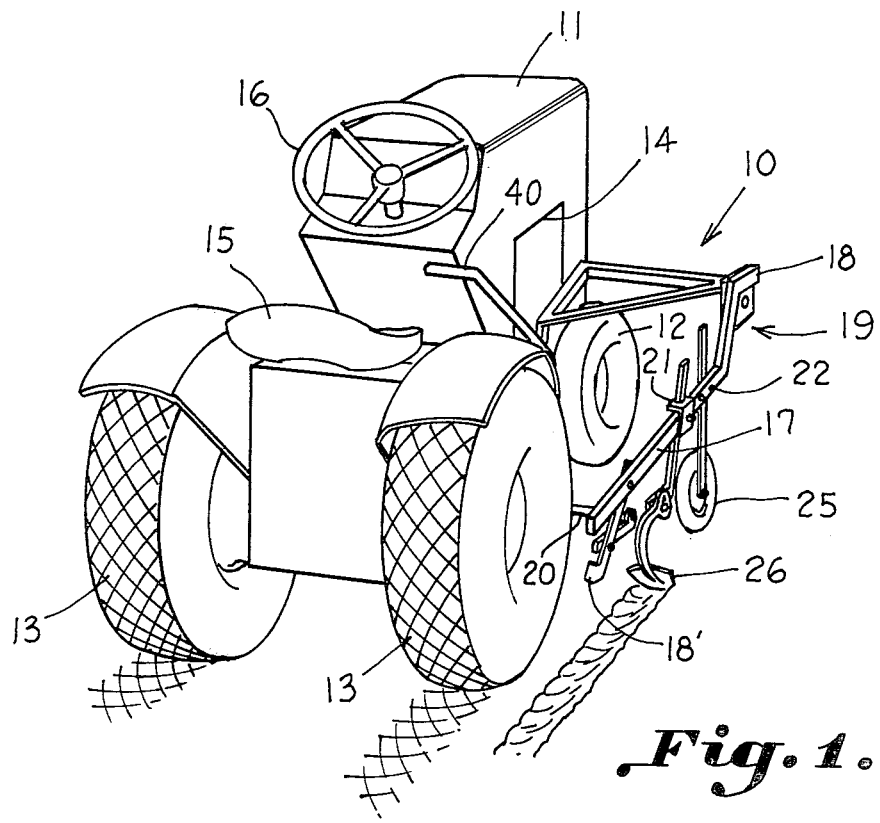
FIG. 1 shows a perspective view of the earth working attachment mounted on a tractor.

With reference to the drawings, the earth working attachment of the present invention is depicted generally as at 10. The attachment 10 is disposed between the front and rear wheels 12, 13 of a commercial type tractor 11 and adjacent the motor 14 thereof. The tractor is further provided with an operator's control station including a seat 15 and steering means 16 in the customary fashion.

Figure 2:
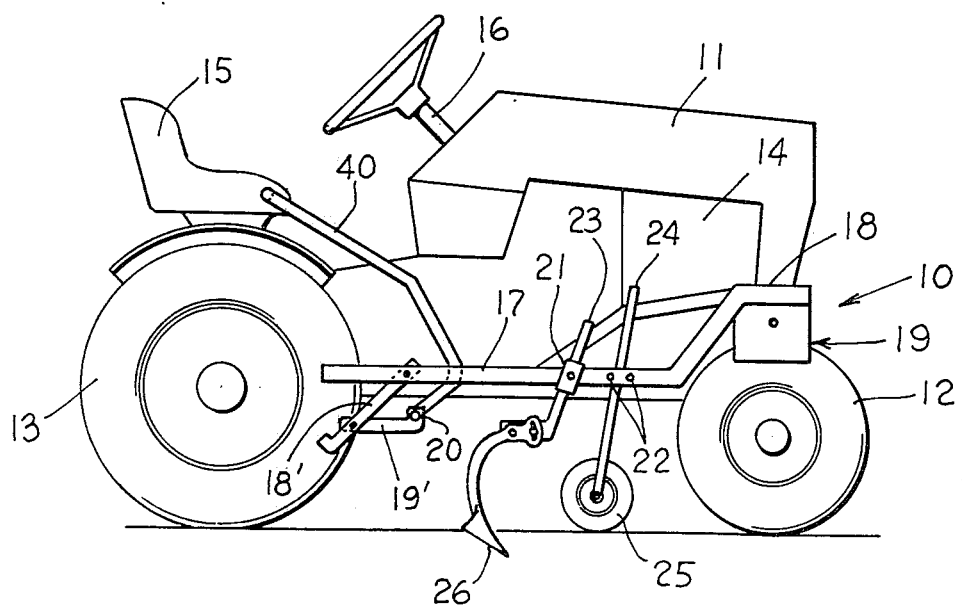
FIG. 2 is a side view of FIG. 1 showing the attachment in earth working engagement.
Figure 3:
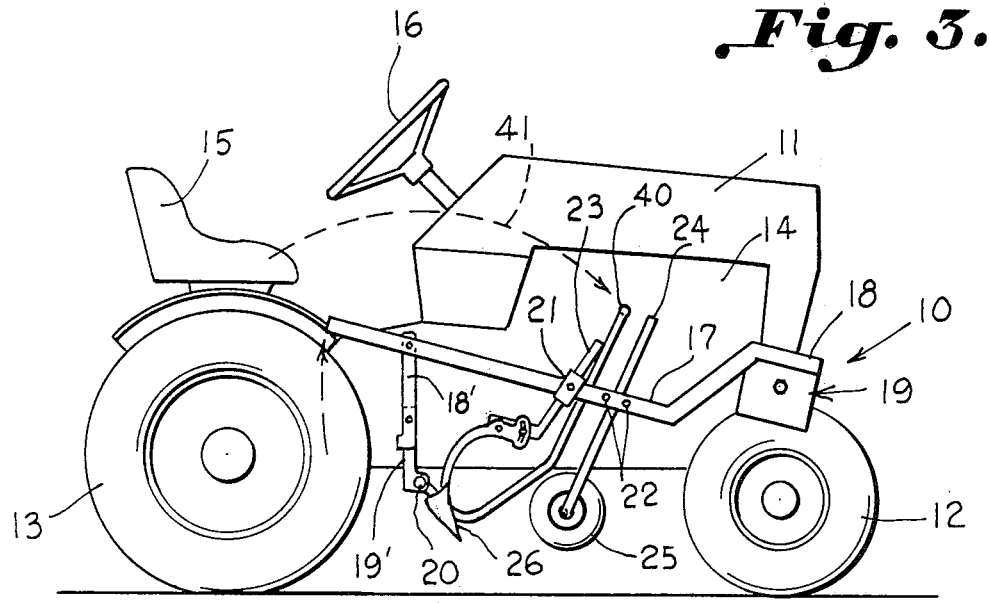
FIG. 3 is a side view similar to FIG. 2 showing the attachment out of earth working engagement.

Referring to FIGS. 2 and 3, the attachment 10 is seen to include a main tool bar 17 disposed generally parallel to the earth with an "L" shaped portion 18 at the forward end thereof adapted to be attached to a support bracket 19 secured to the forward end of the tractor 11. The rearwardly directed end of the tool bar 17 is secured by pivotally connected links 18', 19' to a control shaft 20.

The tool bar 17 is provided with tool securing means 21, 22 adapted to receive the shanks 23, 24 of tools for maintaining the same in place. While a gauge wheel and cultivator blade 25, 26, respectively, are seen as the tools, it is to be understood that the tools can be any of a plurality of earth working tools, such as colters, tines, harrow teeth, etc. The tool shanks 23, 24 can be secured to the tool bar in any known fashion, brackets with holding screws, friction fit nuts and bolts, etc.

Figure 4:
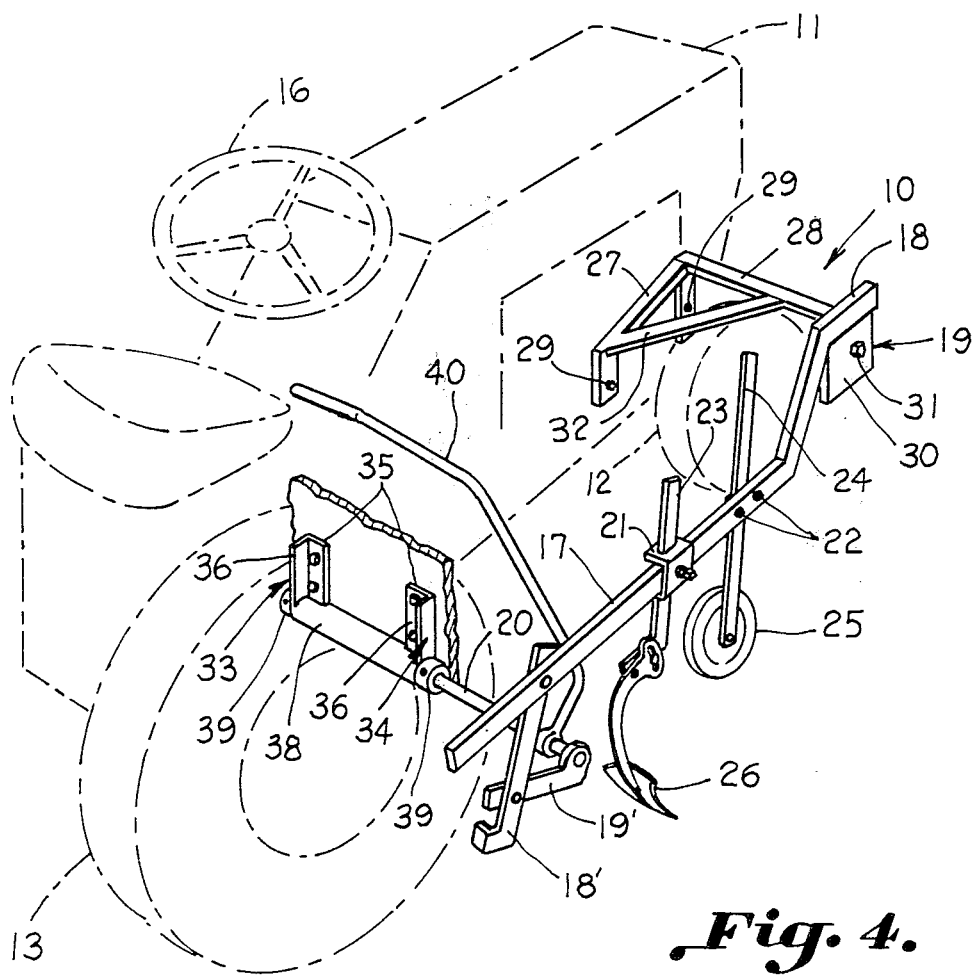
FIG. 4 is a further side view showing details of the mounting brackets and the main tool bar with the associated control linkage.

Further details of the tool bar 17, 18, the mounting bracket 19, control shaft 20, and connecting links 18', 19' are seen in FIG. 4. Mounting bracket 19 is seen to include an "L" shaped unit 27, 28 with leg 27 bolted as at 29 to the tractor frame while leg 28 supports a plate 30 of rectangular configuration at its free end having a stub shaft 31 projecting outwardly therefrom. A diagonal reinforcing bar 32 between legs 27, 28 further rigidifies the legs 27, 28. The rear support shaft 20 is suspended from a pair of spaced angle brackets 33, 34 having legs 35 thereof bolted or otherwise secured to the tractor frame and the free legs 36 provided with pairs of spaced vertical aligned openings (not shown) whereby the shaft 20 which has a portion disposed in a bearing housing 38 can be selectively vertically adjusted and held in place by securing means 39.

The free end of the shaft 20 extends through an opening in link 19' and supports the same for movement therewith. Link 19', in turn, is pivotally connected to link 18' in a scissors-like manner with one end of link 18' connected to tool bar 17. A handle 40 is secured to the shaft 20 and is of a length to extend adjacent the driver's seat for raising and lowering the tools 23, 24 via the linkage 18', 19' and 17 as desired.

In use and with the attachment mounted to the side of the tractor, the operator grasps the handle 40 and moves the same forwardly as shown by the arrow 41 in FIG. 3 in a clockwise direction thereby rotating the shaft 20 to break the linkage 18', 19' from its straightline position to a broken position as shown in FIGS. 2 and 4. This movement lowers the tools 23, 24 into earth engaging position. As the operator reaches the end of the row, he then rotates the handle in a counter-clockwise movement to raise the tools.

While only one attachment has been discussed, it is to be understood that a duplicate one can be placed on the other side of the tractor. Additionally, the rear of the tractor can be provided with an earth working attachment.

While a preferred embodiment of the invention has been described using specific terms, such description is for illustrative purposes only, and it is to be understood that changes and variations may be made without departing from the spirit or scope of the following claims.

What is claimed is:

1. An earth working attachment for a tractor comprising a first support means mounted adjacent the forward end of said tractor and extending outwardly therefrom, a second support means mounted adjacent the rear of said tractor and extending outwardly therefrom, a tool bar disposed between said support means, means pivotally connecting opposite ends of said tool bar to said support means with one end being directly pivoted to a first support means and the other said end being connected by linkage to said second support means, handle means connected to said second support means moving said linkage from a tool bar raised position to a tool bar lowered earth engaging position and at least one earth working tool disposed on said tool bar, said second support including bushing means and a shaft rotatably carried by said bushing means extending outwardly therefrom, said handle means being connected directly to said shaft for effecting rotation of the same and said raising and lowering, said linkage means including a pair of links, one end of one of said links being pivotably connected to said tool bar means and one end of the other of said links being pivotably connected to said shaft with the free ends of said links being pivoted to one another, said shaft being rotatably carried below said tool bar means and together with said link provides a pivot below said tool bar means from which said tool bar means is raised and lowered by said handle means, said first support means including an angle bar secured to said tractor having a leg extending outwardly therefrom terminating in a stub shaft, said stub shaft forming one of the pivot means of said tool bar, said second support means including bracket means secured to a rear portion of the tractor, said bushing means being carried by said bracket means, and said shaft and said stub shaft being generally parallel to one another.

2. The tractor attachment of claim 1 wherein said first and second support means position said tool bar for movement activated by rotation of said handle means in a substantially vertical plane outside a vertical plane of said rear wheels.

* * * * *